(12) United States Patent
Zhou

(10) Patent No.: US 12,304,658 B2
(45) Date of Patent: May 20, 2025

(54) GOODS DELIVERY TERMINAL AND ASSEMBLING METHOD THEREOF

(71) Applicant: Pengyue Zhou, Guangdong (CN)

(72) Inventor: Pengyue Zhou, Guangdong (CN)

(*) Notice: Subject to any disclaimer, the term of this patent is extended or adjusted under 35 U.S.C. 154(b) by 562 days.

(21) Appl. No.: 17/549,936

(22) Filed: Dec. 14, 2021

(65) Prior Publication Data
US 2022/0106058 A1    Apr. 7, 2022

Related U.S. Application Data

(63) Continuation of application No. PCT/CN2020/000138, filed on Jun. 15, 2020.

(30) Foreign Application Priority Data

Jun. 14, 2019  (CN) .......................... 201920905929.7

(51) Int. Cl.
*B64F 1/36*  (2024.01)
*E01F 3/00*  (2006.01)
*B64U 101/64*  (2023.01)

(52) U.S. Cl.
CPC ............... *B64F 1/368* (2013.01); *E01F 3/00* (2013.01); *B64U 2101/64* (2023.01)

(58) Field of Classification Search
CPC .................................. B64F 1/368; E01F 3/00
See application file for complete search history.

(56) References Cited

U.S. PATENT DOCUMENTS

| | | | | |
|---|---|---|---|---|
| 6,164,892 A * | 12/2000 | Malloy | ................... | B64F 1/368 198/370.1 |
| 9,928,749 B2 * | 3/2018 | Gil | ............................ | B60P 3/11 |
| 10,919,702 B1 * | 2/2021 | Berta | ..................... | B65G 11/04 |
| 10,993,569 B2 * | 5/2021 | Gil | .......................... | B65G 67/00 |
| 11,014,785 B1 * | 5/2021 | Marchese | ............... | B66B 9/003 |
| 11,396,383 B2 * | 7/2022 | Kim | ......................... | H04W 4/80 |
| 2015/0317596 A1 | 11/2015 | Hejazi | | |

FOREIGN PATENT DOCUMENTS

| | | |
|---|---|---|
| CN | 107618851 A | 1/2018 |
| CN | 206984905 U | 2/2018 |
| CN | 107758191 A | 3/2018 |
| CN | 207390180 U | 5/2018 |
| CN | 108557452 A | 9/2018 |
| CN | 109004119 A | 12/2018 |
| CN | 109795834 A | 5/2019 |
| EP | 3896005 A1 | 10/2021 |
| WO | 2019095860 A1 | 5/2019 |
| WO | 2020062243 A1 | 4/2020 |

* cited by examiner

*Primary Examiner* — Jonathan Snelting

(57) ABSTRACT

A goods delivery terminal comprises a first module, a second module, a third module, and a fourth module. The third module and the fourth module are capable of transporting goods in a first direction and a second direction respectively, and the second direction intersects the first direction; At least one of the third module and the fourth module is capable of being solely arranged between the first module and the second module, and is capable of independently transporting the goods from the second module to the first module and from the first module to the second module; the third module and the fourth module are also capable of being arranged together between the first module and the second module, and are capable of relay transporting the goods from the second module to the first module and from the first module to the second module.

20 Claims, 10 Drawing Sheets

GOODS DELIVERY TERMINAL AND ASSEMBLING METHOD THEREOF

CROSS REFERENCE TO RELATED APPLICATIONS

The present disclosure is a continuation application of the international application No. PCT/CN2020/000138 filed on Jun. 15, 2020, which claims the priority of Chinese patent application No. 201920905929.7 filed on Jun. 14, 2019. The entire content of the above-identified applications is hereby incorporated by reference.

TECHNICAL FIELD

The present disclosure relates to a goods delivery terminal and assembling method thereof.

BACKGROUND

The goods delivery terminal in a UAV express application is an automated apparatus for the last mile goods delivery and pickup of the UAV. The goods are transferred via the goods delivery terminal between a user who receives/sends the goods and the UAV which delivers the goods. The goods delivery terminal is provided with at least one access opening for the user to put the goods in and to take the goods out, a transport mechanism used for transporting the goods inside the goods delivery terminal, and a platform used for the UAV to land. Optionally, the goods delivery terminal may further comprise a number of storage spaces in order to realize temporary storage of the goods.

However, the existing goods delivery terminals are all-in-one structures, and are each only suitable for a single application scenario and a single deployment environment. For example, at present most of the goods delivery terminals are only deployed in an outdoor open space, so that the user has to go outside to access the goods, but these goods delivery terminals are unable to be deployed inside buildings, so that the user cannot access the goods indoors conveniently.

SUMMARY

As such, the present disclosure proposes a goods delivery terminal suitable for a variety of application scenarios.

In addition, the present disclosure also proposes a method for assembling the goods delivery terminal.

A goods delivery terminal, comprising: a first module for a UAV to land: a second module for a user to access goods: a third module capable of transporting the goods in a first direction, wherein the third module is capable of transferring the goods to the second module, and transferring the goods from the second module, the third module is also capable of transferring the goods to the UAV or the first module at the first module, and transferring the goods from the UAV or the first module at the first module: a fourth module capable of transporting the goods in a second direction intersecting the first direction, wherein the fourth module is capable of transferring the goods to the UAV or the first module at the first module, and transferring the goods from the UAV or the first module at the first module, the fourth module and the third module are also capable of transferring the goods to or from each other: wherein at least one of the third module and the fourth module is capable of being solely arranged between the first module and the second module, and is capable of independently transporting the goods from the first module to the second module and from the second module to the first module: the third module and the fourth module are also capable of being arranged together between the first module and the second module, and are capable of relay transporting the goods from the second module to first module and from the first module to second module.

A method for assembling the goods delivery terminal, comprising: providing the goods delivery terminal: arranging the first module on the top portion of a building: arranging the second module on the ground and near the building; arranging one third module adjacent to the second module, and arranging another third module adjacent to the first module; and arranging the fourth module between the two third modules.

Another method for assembling the goods delivery terminal, comprising: providing the goods delivery terminal: arranging the first module outside a building; arranging the second module inside the building: arranging the third module inside the building and adjacent to the second module; arranging the fourth module between the third module and the first module.

Details of one or more embodiments of the invention are provided in the following drawings and description. Other features, objects and advantages of the invention will become obvious from the description, the drawings and the claims.

BRIEF DESCRIPTION OF DRAWINGS

To better explain the embodiments of the present disclosure or the technical solutions of the prior art, the following will briefly introduce the drawings involved in the description of the embodiments or the prior art. It is obvious that the drawings in the following description are only some embodiments of the invention. For persons skilled in the art, the drawings of other embodiments can be obtained from these drawings without paying creative work.

DETAILED DESCRIPTION OF THE EMBODIMENTS

Figure 1:
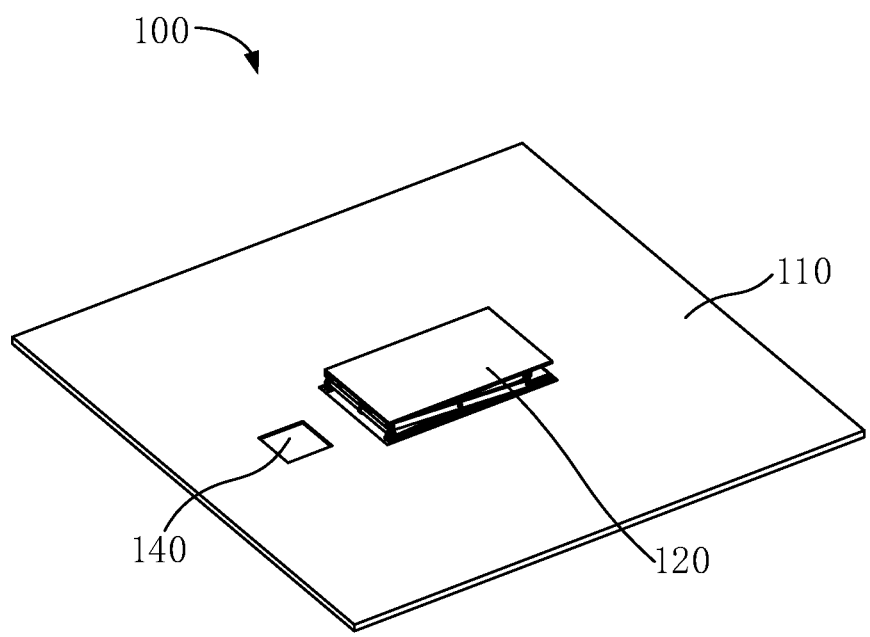
FIG. 1 is a schematic structural diagram of a first module according to one implementation.

In order to help understanding of the present disclosure, the present disclosure will be described more comprehensively hereinafter with reference to the relevant accompanying drawings.

A goods delivery terminal according to one implementation, which is used for goods transfer between a UAV (unmanned aerial vehicle) and a user, wherein the goods may be a parcel. The goods delivery terminal is comprised of multiple modules with different functions. The modules are capable of being assembled flexibly, and the goods are enabled to be transferred between the modules, so that the goods delivery terminal is suitable for a variety of application scenarios and a variety of deployment environments. As shown in FIG. 1, FIG. 3, FIG. 4, FIG. 7 and FIG. 12, the goods delivery terminal comprises a first module 100, a second module 200, a third module 300, a fourth module 400 and a fifth module 500.

The first module 100 is used for the UAV to land. The first module 100 may be installed on the exterior of the building, for example, the first module 100 may be installed on the top portion of the building (such as the roof) or on the exterior wall of the building.

Specifically, the first module 100 comprises a support base 110 and a lift table 120.

Figure 2:
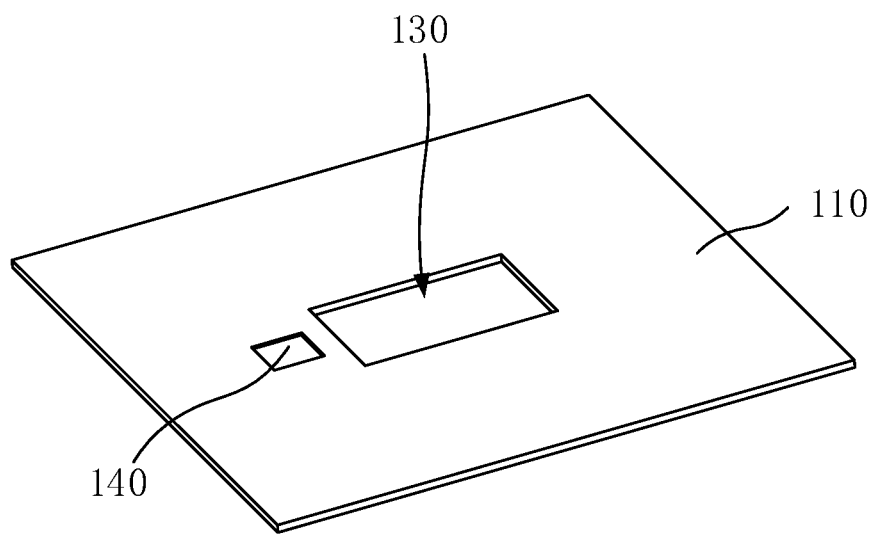
FIG. 2 is a schematic structural diagram of the first module shown in FIG. 1 without a lift table installed.
Figure 3:
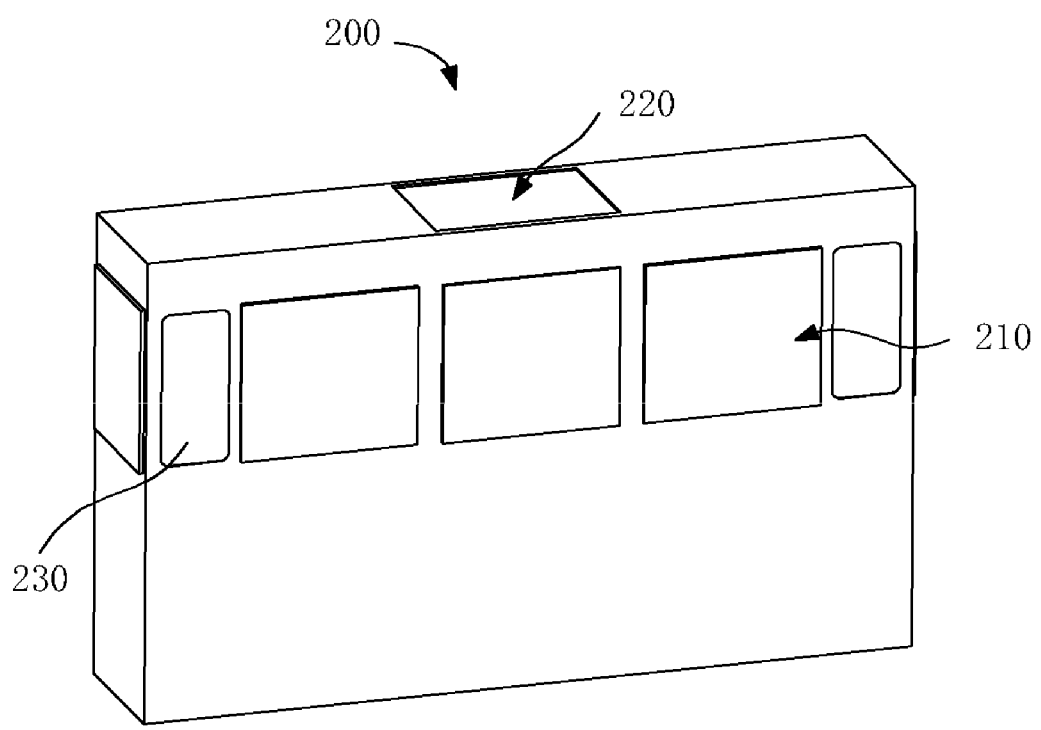
FIG. 3 is a schematic structural diagram of a second module according to one implementation.
Figure 4:
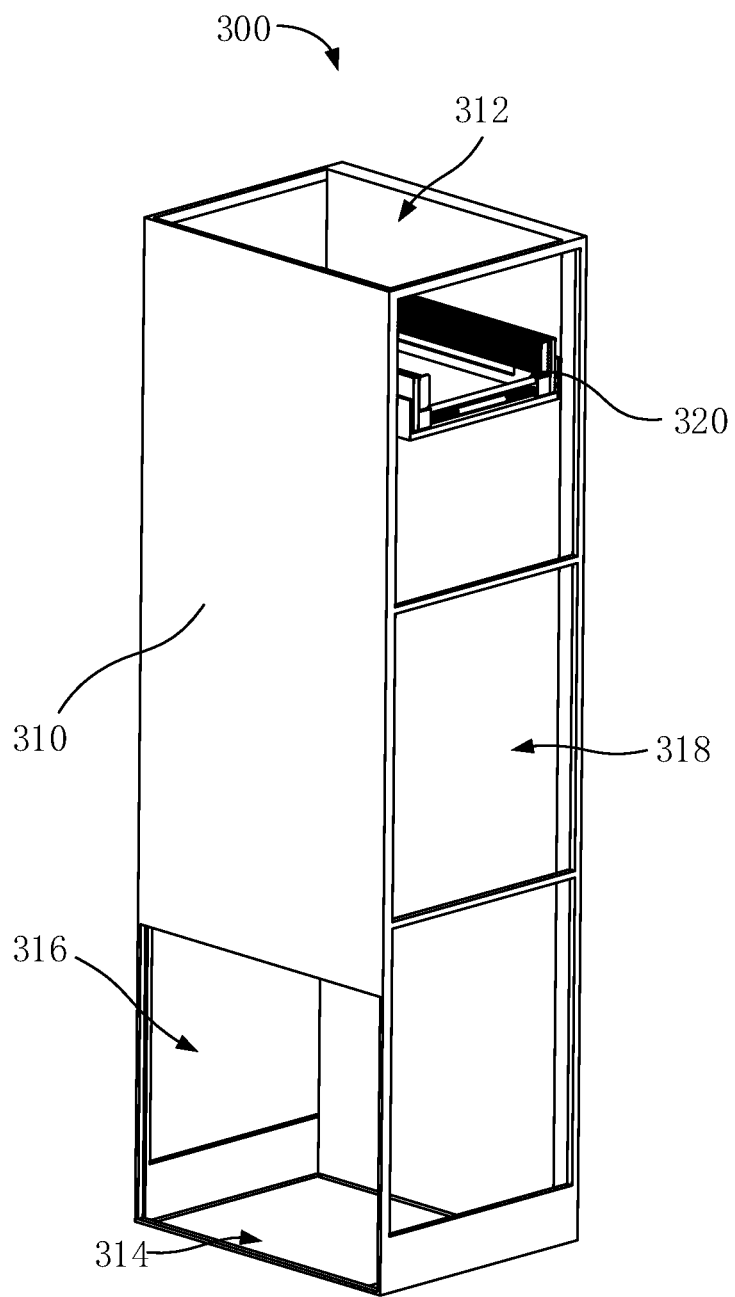
FIG. 4 is a schematic structural diagram of a third module according to one implementation.

Referring to FIG. 2, the support base 110 is capable of supporting the UAV and is used for the UAV to land. The UAV descends onto the support base 110 to load and to offload the goods. A first opening 130 for the goods to pass through is formed in the support base 110. Optionally, the support base 110 is substantially a plate-like structure and is arranged horizontally, the first opening 130 is disposed in central portion of the support base 110 and communicates a space right above the support base 110 and a space right below the support base 110.

Furthermore, a marker 140 is provided on the support base 110 to assist the visual positioning of the UAV, so as to guide the UAV to fly onto the support base 110 accurately.

Optionally, a guiding structure (not shown in the figure) is further provided on the support base 110, so as to guide the UAV to a designated location on the support base 110 after the UAV lands on the support base 110.

Optionally, a securing mechanism (not shown in the figure) capable of securing the UAV is further provided on the support base 110, so as to secure the UAV relative to the support base 110 after the UAV lands on the support base 110, thereby preventing the UAV from being moved by a strong wind in the process of the UAV loading/offloading the goods.

Optionally, a camera component (not shown in the figure) is further provided on the support base 110, so as to monitor and record the process of the UAV loading/offloading the goods.

Optionally, an anemometer (not shown in the figure) is further provided on the support base 110, so as to measure the wind speed at the first module 100. When the wind speed is high, the UAV will stop flying onto the support base 110.

The lift table 120 is capable of being installed on the support base 110. The lift table 120 is capable of supporting the goods and lifting the supported goods up and down, assisting the UAV to load and to offload the goods. Optionally, the lift table 120 is detachably installed at the first opening 130, when the lift table 120 is installed at the first opening 130 the lift table 120 shelters at least part of the first opening 130; alternatively, the lift table 120 is movably installed on the support base 110, the lift table 120 is capable of moving to the first opening 130 so as to shelter at least part of the first opening 130, and is also capable of moving away from the first opening 130 to make the first opening 130 fully exposed, in one implementation the lift table 120 is slidably installed on the support base 110.

The second module 200 is used for the user to access the goods. The second module 200 is capable of being arranged near the ground, and may be arranged inside a building. In one implementation, the second module 200 is a cabinet structure. Specifically, the second module 200 comprises at least one second opening 210 for the user to access the goods, that is, the user puts the goods into the second module 200 or takes the goods out from the second module 200 via the second opening 210. Optionally, a plate is further provided adjacent to the second opening 210 and inside the second module 200, allowing the goods to be placed on the plate. The second module 200 further comprises a third opening 220 for goods transfer to/from another module of the goods delivery terminal. It should be understood that other automated equipment, such as an automated goods delivery robot, may put the goods into the second module 200 or take the goods out from the second module 200 via the second opening 210.

Furthermore, an interactive component 230 for interacting with the user is further provided on the second module 200. The interactive component 230 is a touch screen and/or a button, so as to ease the operation that the user accesses the goods.

Furthermore, a weighing device (not shown in the figure) capable of measuring weight of the goods is further provided in the second module 200, so as to check whether the weight of the goods exceeds the maximum load of the UAV, the result of the measurement may also be used for calculation of freight fee.

Furthermore, a reading device (not shown in the figure) capable of reading the goods information is further provided in the second module 200, so as to recognize identity of the goods, thereby preventing the unrecognized goods from being loaded to the UAV. Optionally, the reading device is a QR code reading device or a RFID tag reading device.

The third module 300 is capable of transporting the goods in a first direction to change elevation of the goods. The third module 300 is capable of transferring the goods to the second module 200, and transferring the goods from the second module 200. The third module 300 is also capable of transferring the goods to the first module 100 or the UAV at the first module 100, and transferring the goods from the UAV or the first module 100 at the first module 100. Optionally, the first direction is vertical direction. In the illustrated embodiment, the third module 300 is at least partially located below the first module 100 and transfers the goods to/from the UAV via the first opening 130. In other embodiments, the goods may not be directly transferred between the third module 300 and the UAV, for example, the third module 300 transfers the goods to the first module 100, then the UAV loads the goods from the first module 100.

The fourth module 300 is capable of transporting the goods in a second direction intersecting the first direction. Optionally, the second direction is horizontal direction, and the fourth module 400 may transfer the goods to the second module 200 and may transfer the goods from the second module 200. The fourth module 400 is also capable of transferring the goods to the first module 100 or the UAV at the first module 100, and transferring the goods from the UAV or the first module 100 at the first module 100, the fourth module 400 and the third module 300 are also capable of transferring the goods to/from each other. In the illustrated embodiment, the fourth module 400 is at least partially located at a side of the first module 100, and is capable of transporting the goods offloaded by the UAV from the lift table 120 and transporting the goods to the lift table 120 for the UAV to load.

The third module 300 and/or the fourth module 400 is capable of being solely arranged between the first module 100 and the second module 200, and is capable of independently transporting the goods from the second module 200 to the first module 100 and from the first module 100 to the second module 200. The third module 300 and the fourth module 400 are also capable of being arranged together between the first module 100 and the second module 200, and are capable of relay transporting the goods from the second module 200 to the first module 100 and from the first module 100 to the second module 200.

It should be noted that, in addition to retaining the support base 110 and the marker 140 for the UAV to land, the first module 100 may vary part of its structure according to different situations. One example is that the first module 100 may not retain the lift table 120 when the first module 100 is applied for the case that the third module 300 transfers the goods to the UAV and transfers the goods from the UAV at the first module 100, another example is that the first module 100 may not retain the first opening 130 when the first module 100 is applied for the case that the fourth module 400 transfers the goods to the first module 100 and transfers the goods from the first module 100.

In one embodiment, the third module 300 comprises a first support structure 310 and a first transport mechanism 320.

In the illustrated embodiment, the first support structure 310 is substantially a hollow long structure extending along the first direction with an opening at each end. The first transport mechanism 320 is slidable in the first support structure 310. After receiving the goods at either end of the first support structure 310, the first transport mechanism 320 is capable of transporting the goods to the other end of the first support structure 310. Wherein, a fourth opening 312 and a fifth opening 314 are the opening at each end of the first support structure 310 respectively, and after the third module 300 is installed, the fourth opening 312 is higher than the fifth opening 314. A plurality of the first support structures 310 are capable of being end to end joined to form a first transport channel, wherein the fourth opening 312 of one of two adjacent first support structures 310 may be communicated with the fifth opening 314 of the other. One first transport mechanism 320 is capable of moving in the first transport channel from one end to the other end, thereby increasing a distance of transporting the goods in the first direction.

Figure 5:
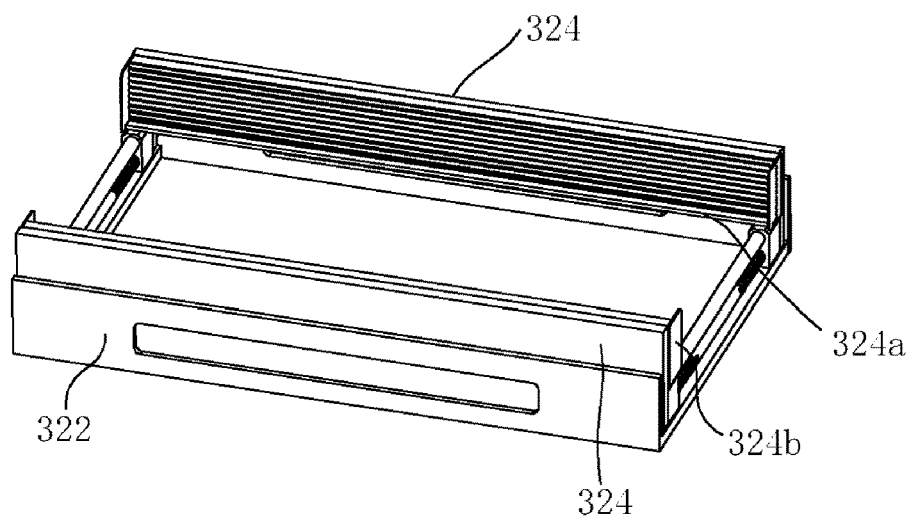
FIG. 5 is a schematic structural diagram of a first transport mechanism of the third module shown in FIG. 4.
Figure 6:
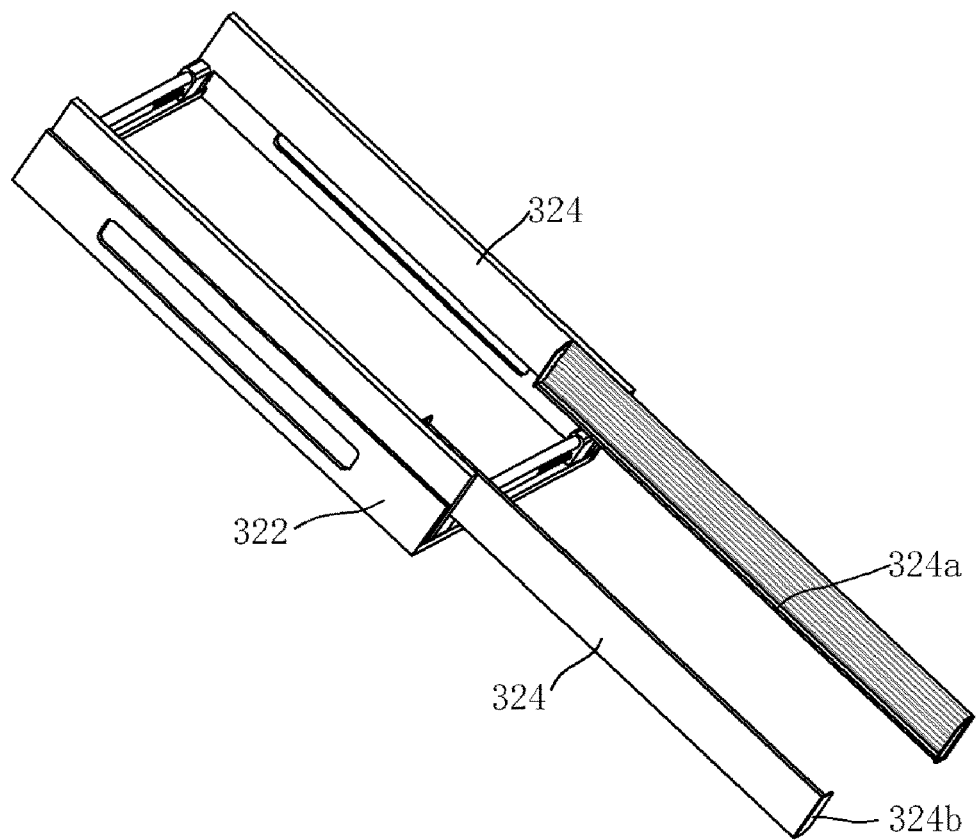
FIG. 6 is a schematic structural diagram of the first transport mechanism shown in FIG. 5 when the first transport mechanism is in another state.

Please refer to FIG. 5 and FIG. 6 together. Specifically, the first transport mechanism 320 comprises a first moving member 322 and two oppositely arranged clamping arms 324 arranged on the first moving member 322. The first moving member 322 is arranged in the first support structure 310, and is slidable inside the first support structure 310. At least one of the two clamping arms 324 is capable of moving closer to or farther from the other, enabling the two clamping arms 324 to clamp or release the goods respectively. The first transport mechanism 320 slides relative to the first support structure 310 via the first moving member 322, enabling the clamping arms 324 to at least partially move out from the fourth opening 312 to transfer the goods to/from the UAV. Specifically, when the first support structure 310 is located below the first module 100 and the fourth opening 312 is communicated with the first opening 130, the clamping arms 324 are capable of at least partially moving out from the fourth opening 312 and passing through the first opening 130 to transfer the goods to/from the UAV.

It should be understood that the first transport mechanism 320 is not limited to the above-mentioned structure. For example, in another implementation, the first transport mechanism 320 comprises a first moving member 322 and a support plate arranged on the first moving member 322, the support plate is capable of supporting the goods, thus the first transport mechanism 320 does not need to include the clamping arms 324. In addition, the first support structure 310 is not limited to be the hollow long structure. For example, in another implementation, the first support structure 310 may be a long sliding rail. It is protective of the first transport mechanism 320 and the goods that the first support structure 310 is configured as a hollow long structure.

Optionally, the opposite sides of the two clamping arms 324 each extends horizontally to form a supporting portion 324a respectively, and the supporting portions 324a of the two clamping arms 324 are capable of jointly supporting the goods.

Figure 7:
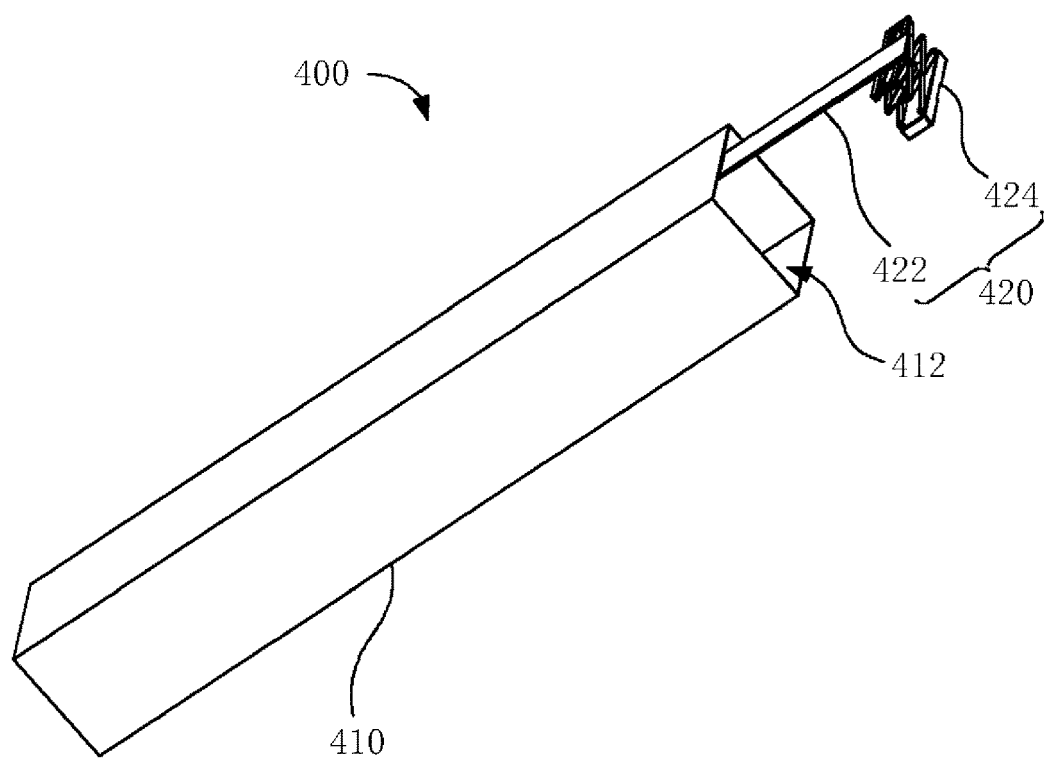
FIG. 7 is a schematic structural diagram of a fourth module according to one implementation.
Figure 8:
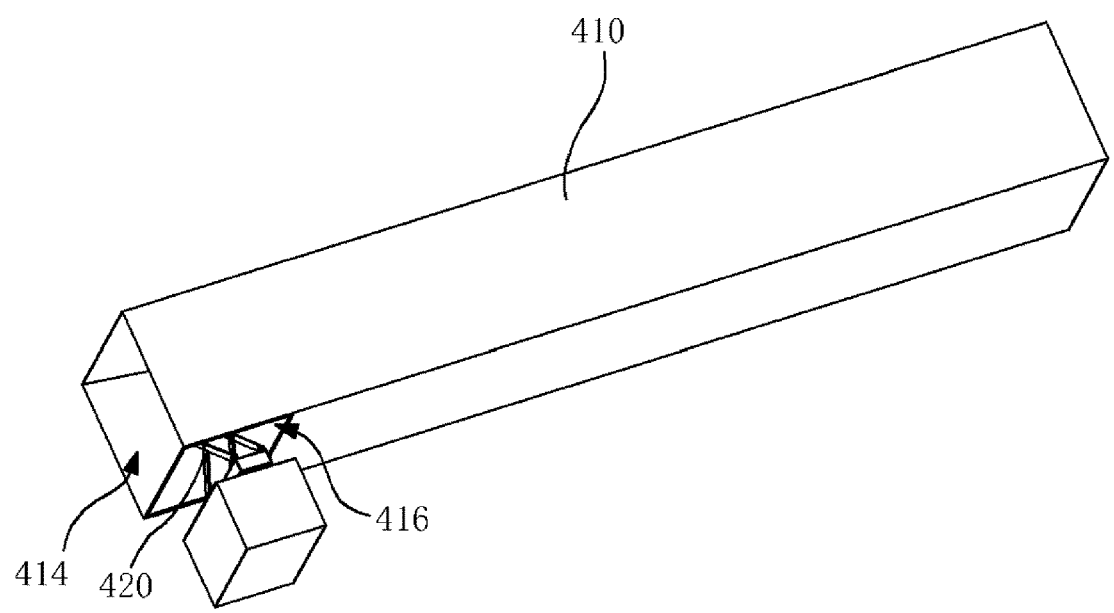
FIG. 8 is a schematic structural diagram that the fourth module shown in FIG. 7 grabs goods via an eighth opening.

Please refer to FIG. 7 and FIG. 8 together. Specifically, the fourth module 400 comprises a second support structure 410 and a second transport mechanism 420.

Specifically, in the illustrated embodiment, the second support structure 410 is substantially a hollow long structure extending along the second direction with an opening at each end. The second transport mechanism 420 is slidable in the second support structure 410. After receiving the goods at either end of the support structure 410, the second transport mechanism 420 transports the goods to the other end of the second support structure 410. Wherein, a sixth opening 412 and a seventh opening 414 are the opening at each end of the second support structure 410 respectively. A plurality of second support structures 410 are capable of being end to end joined to form a second transport channel, wherein the sixth opening 412 of one of two adjacent second support structures 410 may be communicated with the seventh opening 414 of the other. One second transport mechanism 420 is capable of moving in the second transport channel from one end to the other end, thereby increasing a distance of transporting the goods in the second direction.

Specifically, the second transport mechanism 420 comprises a second moving member 422 and a gripping member 424 arranged on the second moving member 422. The second moving member 422 is arranged in the second support structure 410, and is slidable inside the second support structure 410. The gripping member 424 is capable of grabbing the goods from above the goods. Optionally, the top portion of the goods is provided with a part used for being grabbed, and the gripping member 424 is capable of securing the part of the goods. The second transport mechanism 420 slides relative to the second support structure 410 via the second moving member 422, enabling the gripping member 424 to move out from the sixth opening 412 to grab the goods from the lift table 120 and to release the goods onto the lift table 120. Specifically, when the second support structure 410 is located at the side of the first module 100 and the sixth opening 412 is near the edge of the first module 100, the gripping member 424 is capable of moving out from the sixth opening 412 and being positioned above the lift table 120 to grab the goods from the lift table 120 and to release the goods onto the lift table 120. The lift table 120 may lift up and down to assist the gripping member 424 to grab and to release the goods.

Figure 9:
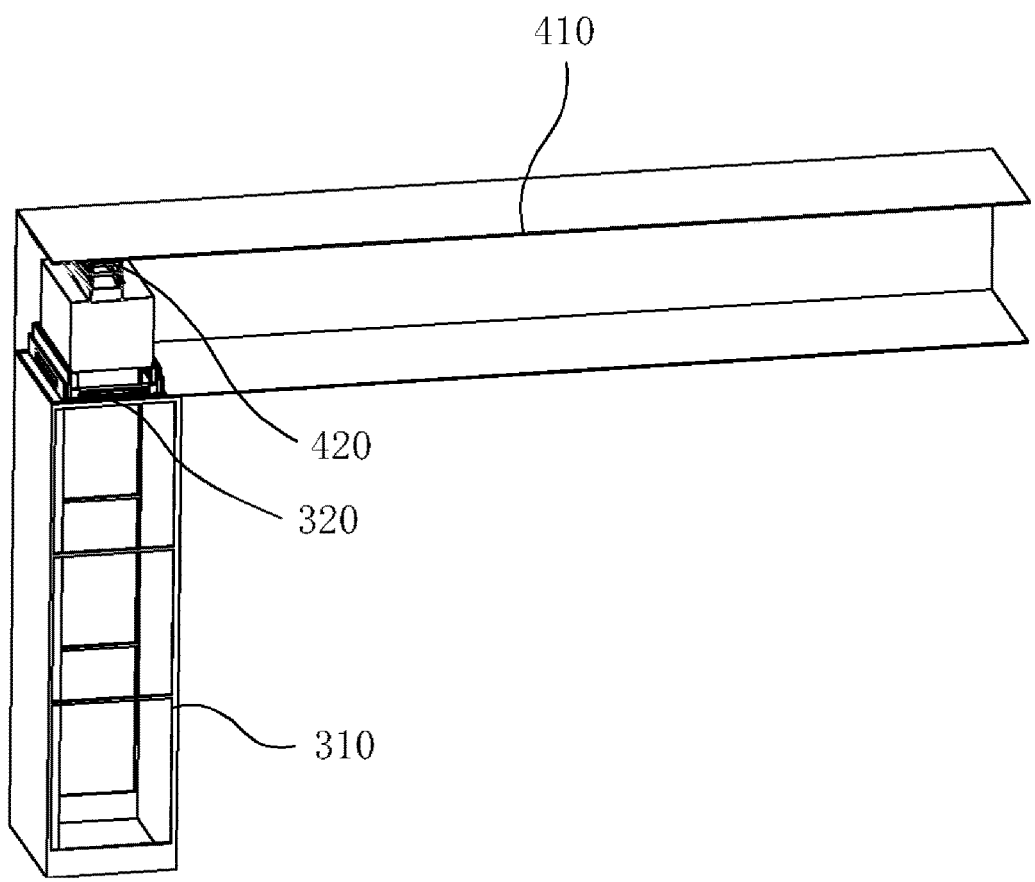
FIG. 9 is a schematic diagram that the fourth module shown in FIG. 7 is at least partially above the third module shown in FIG. 4 and the fourth module transfers goods to/from the third module, wherein a second support structure of the fourth module is provided with part of side wall omitted.

Furthermore, an eighth opening 416 is formed in a side wall of the second support structure 410, the eighth opening 416 is near the seventh opening 414, the fourth module 400 is capable of transferring the goods to/from the third module 300 via the eighth opening 416. Specifically, as shown in FIG. 9, when the fourth module 400 is at least partially above the third module 300 and the fourth opening 312 is communicated with the eighth opening 416, the eighth opening 416 is below the second transport mechanism 420, the clamping arms 324 are capable of at least partially moving out from the fourth opening 312 and moving into the second supporting structure 410 to transfer the goods to/from the second transport mechanism 420.

Figure 10:
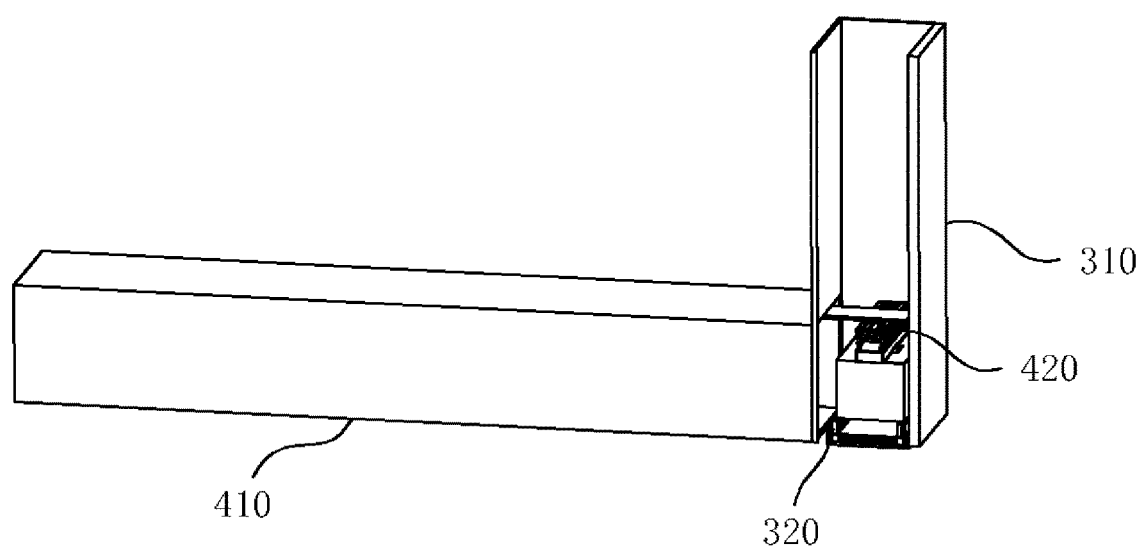
FIG. 10 is a schematic diagram that the third module shown in FIG. 4 is at least partially higher than the fourth module shown in FIG. 7 and the third module transfers goods to/from the fourth module, wherein a first support structure of the third module is provided with part of side wall omitted.

Furthermore, please refer to FIG. 4 again. A ninth opening 316 is formed in a side wall of the first support structure 310, the ninth opening 316 is near the fifth opening 314, and the third module 300 is capable of transferring the goods to/from the fourth module 400 via the ninth opening 316. Specifically, as shown in FIG. 10, when the third module 300 is at least partially higher than the fourth module 400 and the ninth opening 316 is communicated with the sixth opening 412, the gripping member 424 is capable of moving out from the sixth opening 412 and moving into the first support structure 310 to transfer the goods to/from the first transport mechanism 320 with the first transport mechanism 320 being below the gripping member 424.

Figure 11:
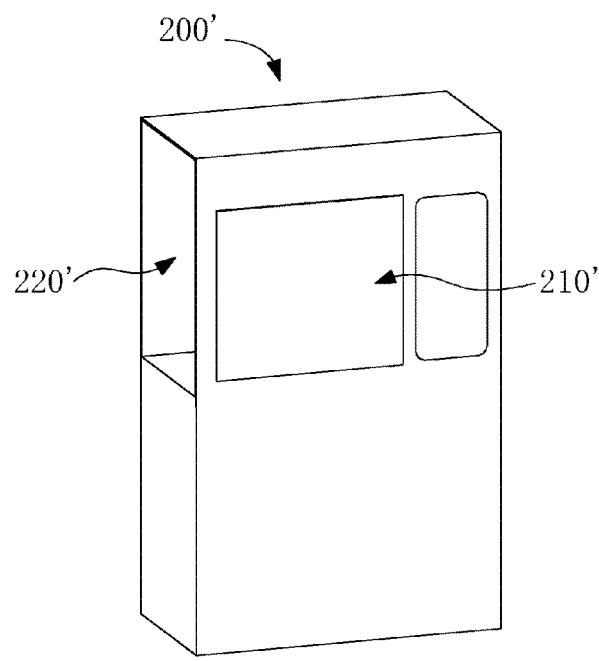
FIG. 11 is a schematic structural diagram of a second module according to another implementation
Figure 12:
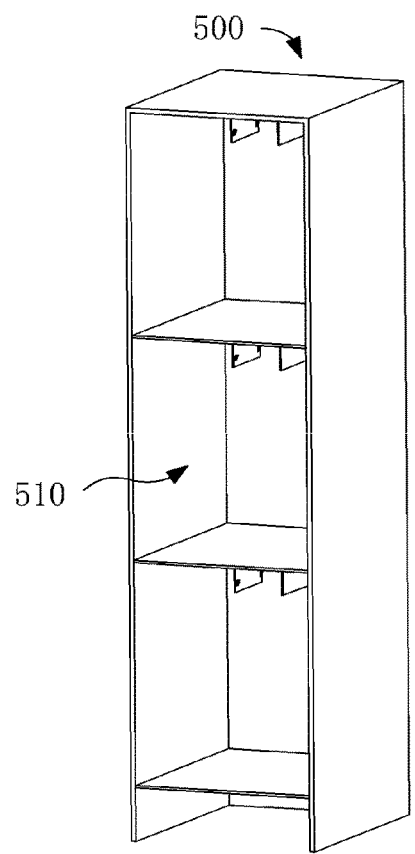
FIG. 12 is a schematic structural diagram of a fifth module according to one implementation.

Furthermore, the third module 300 is also capable of moving the goods in a third direction intersecting with the first direction, optionally, the third direction is perpendicular to the first direction. Specifically, please refer to FIG. 4 and FIG. 6 again. The two clamping arms 324 are also capable of extending or retracting in the third direction to move the goods in the third direction, a tenth opening 318 is further provided in a side wall of the first support structure 310, the two clamping arms 324 extend and partially move out from the tenth opening 318 to move the goods out of the first support structure 310 or to clamp the goods from the outside of the first support structure 310. Accordingly, the third module 300 may transfer the goods to/from the second module 200 via the tenth opening 318. As shown in FIG. 11, in another implementation of the second module 200, the third opening 220' may be arranged in a side surface of the second module 200', the third module 300 is located at a side of the second module 200' and the tenth opening 318 is communicated with the third opening 220', the first transport mechanism 320 slides to approach the tenth opening 318, the two clamping arms 324 extend or retract in the third direction to move the goods into the second module 200' or to clamp the goods from the second module 200' respectively. Alternatively, the third module 300 may transfer the goods to/from the second module 200 via the fifth opening 314, please refer to FIG. 3 again, the third opening 220 may be arranged in a top surface of the second module 200, when the third module 300 is located above the second module 200 and the fifth opening 314 is communicated with the third opening 220, the first transport mechanism 320 slides to the fifth opening 314, and the first transport mechanism 320 takes the goods from the second module 200 or releases the goods to the second module 200.

Optionally, please refer to FIG. 8 again, the gripping member 424 is capable of extending or retracting, and a direction in which the gripping member 424 extends or retracts intersects a direction in which the second moving member 422 slides. In one implementation, the direction in which the gripping member 424 extend or retract is vertical direction, enabling the gripping member 424 to adjust a position where it grabs the goods in vertical direction, so that the lift table 120 does not need to lift up and down when the gripping member 424 transfers the goods to/from the lift table 120, and the clamping arms 324 do not need to move into the second support structure 410 when the gripping member 424 transfers the goods to/from the clamping arms 324, additionally, the fourth module 400 may transfer the goods to/from the second module 200 via the eighth openings 416, that is, when the third opening 220 is arranged in the top surface of second module 200, and the fourth module is above the second module 200 with the eighth opening 416 being communicated with the third opening 220, the gripping member 424 slides to approach the eighth opening 416, extends or retracts in vertical direction to put the goods into the second module 200 or grab the goods from the second module 200 respectively.

Optionally, the gripping member 424 is slidable relative to the second moving member 422, and the sliding direction is parallel to the direction in which the second moving member 422 slides relative to the second support structure 410, so as to increase a sliding distance of the gripping member 424 compared with the second moving member 422.

Optionally, the gripping member 424 is rotatable relative to the second moving member 422, and the rotation axis is perpendicular to the direction in which the second moving member 422 slides relative to the second support structure 410, so as to adjust an orientation in which the gripping member 424 grabs the goods. In one implementation, the rotation axis is parallel to vertical direction.

Please refer to FIG. 12 again. The fifth module 500 is used to store the goods waiting for the UAV or the user to be taken. The fifth module 500 is provided with a plurality of storage spaces used for accommodating the goods and an eleventh opening 510 for the goods to enter and to exit the storage space. Specifically, a plurality of storage spaces in the fifth module 500 are aligned along the first direction and separated from each other by a plate on which the goods may be placed. The third module 300 is capable of moving the goods into or out of the storage space of the fifth module 500 by moving the goods in the third direction. In the illustrated embodiment, when the fifth module 500 is located at a side of the third module 300 and the eleventh opening 510 is communicated with the tenth opening 318 of the third module 300, the clamping arms 324 are capable of moving the goods into the storage space or clamping the goods from the storage space. It should be understood that the fifth module 500 may be omitted, that is, the goods delivery terminal may not have the function of storing a plurality of the goods.

Optionally, a plurality of fifth modules 500 are capable of being located at the side of the third module 300 and stacked along the first direction, so as to increase the goods storage capacity of the goods delivery terminal.

Optionally, please refer to FIG. 5 and FIG. 6 again. Each clamping arm 324 further comprises a positioning piece 324b. The positioning pieces 324b are each mounted to the opposite sides of extending parts of the two clamping arms 324 respectively, and are each disposed at end portion of the respective extending part. The positioning pieces 324b are capable of pushing the goods located in the fifth module 500 by extension/retraction of the clamping arms 324 in the third direction in order to adjust a position of the goods, so that the goods are placed properly relative to the clamping arms 324 in the third direction when the clamping arms 324 clamp the goods located in the fifth module 500.

Optionally, the goods delivery terminal further comprises a plurality of door panels, some door panels are movably installed on the first module 100 and on the second module 200, and automatically close the first opening 130 and the second opening 210 when the first opening 130 and second openings 210 are not utilized, some other door panels are detachably installed on the first support structure 310 and the second support structure 410, and are used for closing the openings of the first support structure 310 which are not communicated with other modules and the openings of the second support structure 410 which are not communicated with other modules, so as to close the interior space of the goods delivery terminal, thereby ensuring the security of the goods inside the goods delivery terminal. Additionally, the lift table 120 may be installed on the movable door panel of the first opening 130, enabling the lift table 120 to move to the first opening 130 and to move away from the first opening 130 automatically.

Optionally, the second module 200 is provided with a main controller (not shown in the figure). The third module 300 and the fourth module 400 are both capable of being electrically connected to the first module 100 and to the second module 200, and are both capable of transmitting electricity and data, the third module 300 and the fourth module 400 are also capable of being electrically connected to each other, enabling the main controller to control operation of the first module 100, the third module 300, the fourth module 400 and the second module 200. Additionally, as the second module 200 may be arranged near the ground, it facilitates operation personnel to manually operate and maintain the main controller.

The above goods delivery terminal owns at least the following advantages:
1. The goods delivery terminal has a variety of assembly forms suitable for different application scenarios and different deployment environments by configuring type of the modules, number of the modules and ways of assembling, thus expanding the application scope of the goods delivery terminal and lowering the cost of both design and production.
2. The goods delivery terminal is capable of being transported and installed in units of the modules, so as to ease the transportation, installation and maintenance of the goods delivery terminal.
3. The goods delivery terminal is capable of achieving functional upgrade to meet updated usage requirements by adding, reducing or replacing the constitutive modules, as well as by adjusting positions of the modules, without a need to replace whole of the installed goods delivery terminal.

The assembly forms of the above-mentioned goods delivery terminal are taken examples as follows, but are not limited to the following embodiments.

Figure 13:
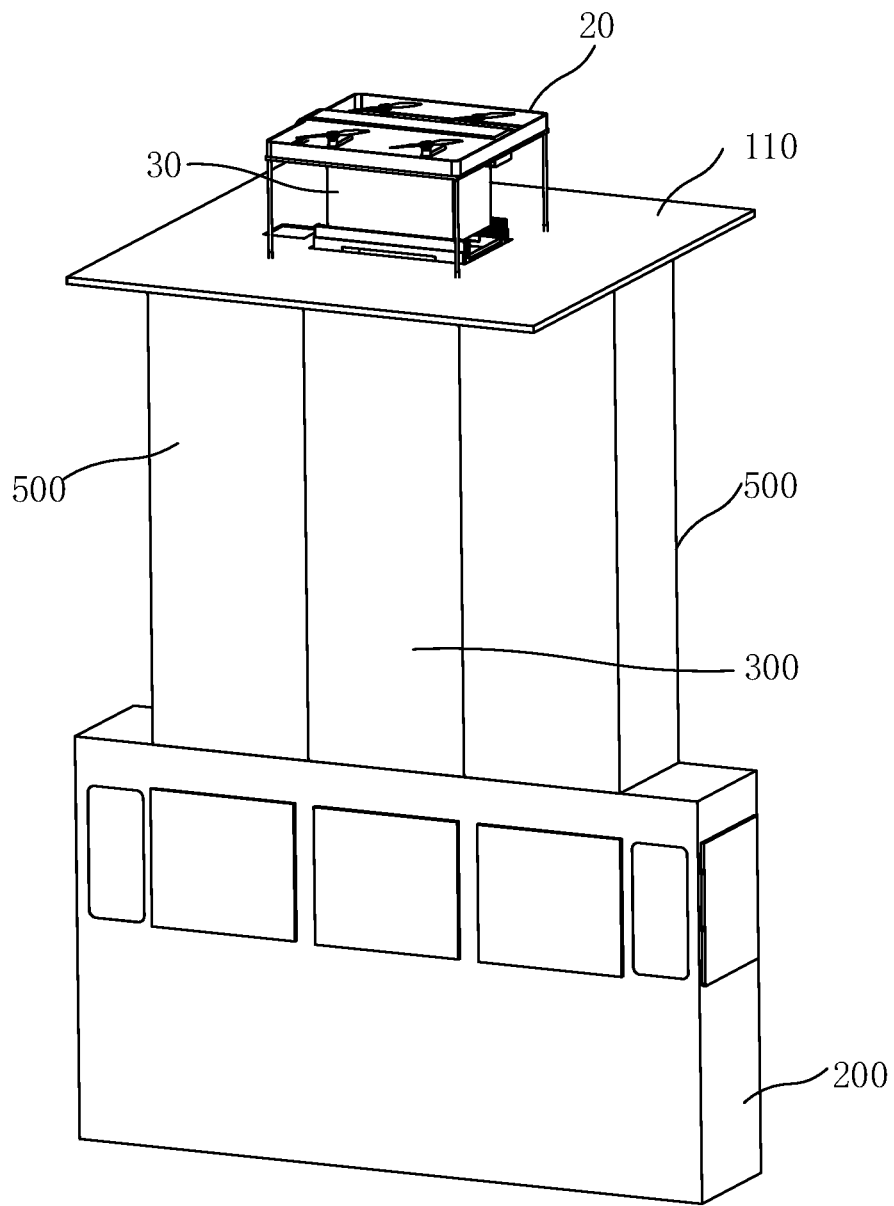
FIG. 13 is a schematic structural diagram of a goods delivery terminal in the first embodiment.

As shown in FIG. 13, the goods delivery terminal of the first embodiment is one assembly form of the above-mentioned goods delivery terminal. The goods delivery terminal of the first embodiment is deployed in an outdoor open space, and comprises the first module 100, the second module 200, the third module 300 and the fifth module 500. The third module 300 is solely arranged between the first module 100 and the second module 200.

In the first embodiment, the first module 100 is provided without the lift table 120.

The second module 200 is located below the first module 100, the first module 100 and the second module 200 have a large difference in elevation, so that the location where the UAV 20 loads/offloads the goods 30 is far away from the location where the user accesses the goods 30, thus avoiding the physical contact of the UAV 20 and the user, and diminishing impact of downwash airflow and noise on persons below when the UAV 20 flies.

The third module 300 is arranged between the first module 100 and the second module 200. The first support structure 310 extends in vertical direction. The fourth opening 312 of the first support structure 310 is communicated with the first opening 130, and the fifth opening 314 is communicated with the third opening 220 of the second module 200.

Two groups of fifth modules 500 are arranged at two sides of the first support structure 310 respectively, and the eleventh openings 510 of the fifth modules 500 are communicated with the tenth openings 318.

A method for delivering the goods 30 based on the goods delivery terminal of the first embodiment is as follows.

Delivery of the goods 30 from the UAV 20 to the second module 200 is as follows: the UAV 20 offloads the goods 30 onto the first transport mechanism 320 which at least partially passes through the first opening 130, the first transport mechanism 320 slides to the fifth opening 314 and releases the goods 30 to the second module 200.

Delivery of the goods 30 from the second module 200 to the UAV 20 is as follows: the first transport mechanism 320 clamps the goods 30 from the second module 200 and transports the goods 30 to the fourth opening 312, the first transport mechanism 320 at least partially passes through the first opening 130, then the UAV 20 loads the goods 30.

Delivery of the goods 30 between the fifth module 500 and the UAV 20 or between the fifth module 500 and the second module 200 is similar to the delivery of the goods 30 between the second module 200 and the UAV 20, except that the first transport mechanism 320 of the third module 300 slides to approach the tenth opening 318, and moves the goods 30 into the storage space or clamps the goods 30 from the storage space.

Figure 14:
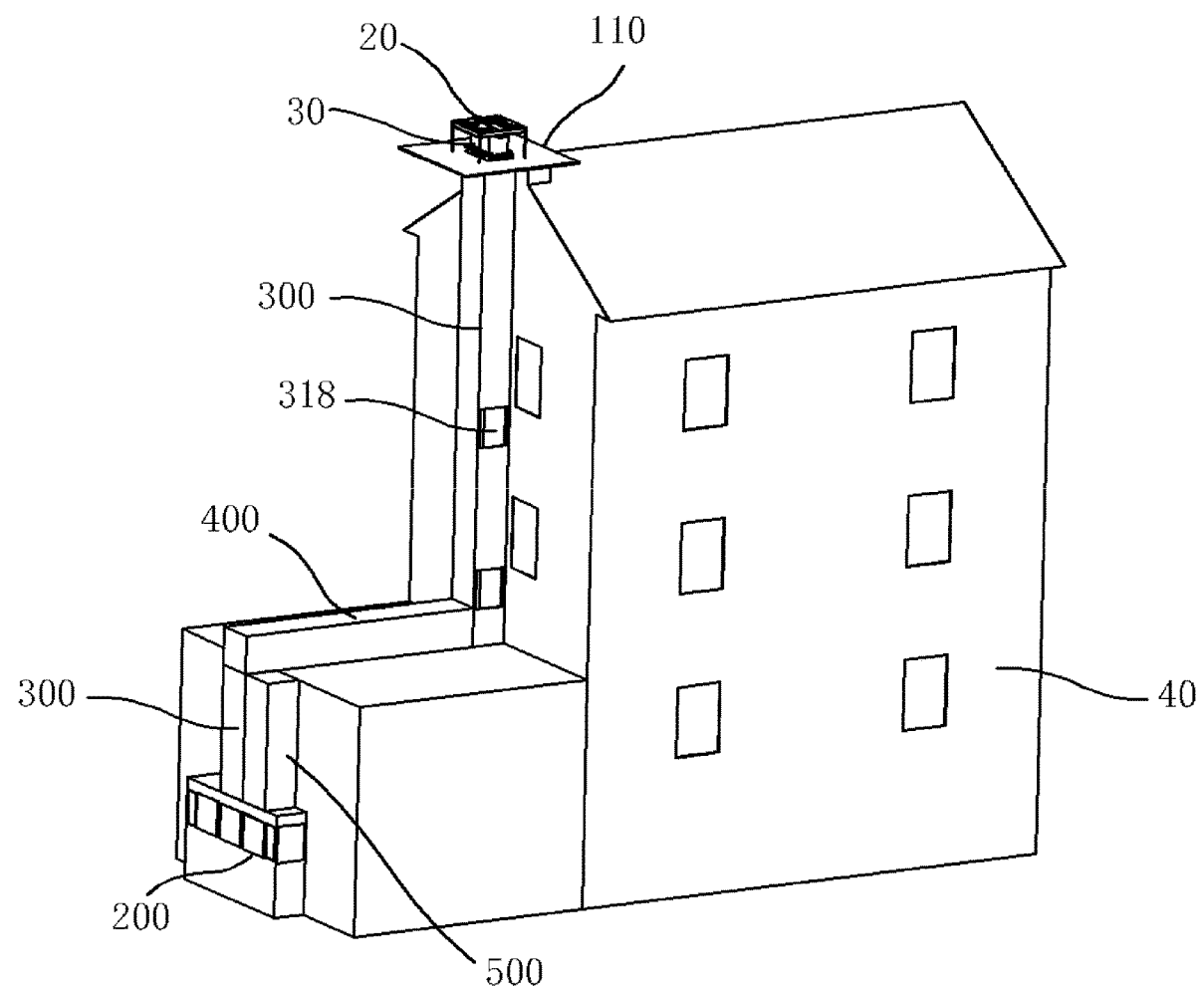
FIG. 14 is a schematic structural diagram of a goods delivery terminal in the second embodiment.

As shown in FIG. 14, the goods delivery terminal of the second embodiment is another assembly form of the above-mentioned goods delivery terminal. The goods delivery terminal of the second embodiment is deployed on the exterior of a building 40, and comprises the first module 100, the second module 200, the third module 300 and the fourth module 400. The third module 300 and the fourth module 400 are arranged together between the first module 100 and the second module 200.

The first module 100 is arranged on the top portion of the building 40, for example, arranged on the roof.

The second module 200 is arranged on the ground and near the exterior wall of the building 40.

The third modules 300 are divided into two groups, one group is arranged adjacent to the first module 100 and the other group is arranged adjacent to the second module 200. Two groups of the third modules 300 are respectively installed on two exterior walls of the building 40. The two exterior walls are parallel and spaced apart, and are connected by a horizontal terrace. The fourth module 400 is arranged between the two groups of third modules 300, and is installed on the horizontal terrace. It should be noted that each group of the third module 300 may be comprised of a plurality of the first support structures 310 joined together.

Specifically, the fourth opening 312 of the third module 300 which is adjacent to the first module 100 is communicated with the first opening 130 of the first module 100, and the ninth opening 316 is communicated with the sixth opening 412 of the fourth module 400; The eighth opening 416 of the fourth module 400 is communicated with the fourth opening 312 of the third module 300 which is adjacent to the second module 200; the fifth opening 314 of the third module 300 which is adjacent to the second module 200 is communicated with the third opening 314 of the second module 200.

A method for delivering the goods 30 based on the goods delivery terminal of the second embodiment is as follows.

Delivery of the goods 30 from the UAV 20 to the second module 200 is as follows: the UAV 20 offloads the goods 30 onto the first transport mechanism 320 of the third module 300 which is adjacent to the first module 100, subsequently the first transport mechanism 320 slides to approach the ninth opening 316, the gripping member 424 of the fourth module 400 moves into the first support structure 310 of the third module 300 and is located right above the first transport mechanism 320, the gripping member 424 grabs the goods 30 on the first transport mechanism and slides until it is located right above the eighth opening 41, the first transport mechanism 320 of the third module 300 which is adjacent to the second module 200 at least partially moves into the second support structure 410 and clamps the goods, after the gripping member 424 releases the goods the first transport mechanism 320 transports and releases the goods 30 to the second module 200.

Delivery of the goods 30 from the second module 200 to the UAV 20 is as follows: the first transport mechanism 320 of the third module 300 which is adjacent to the second module 200 clamps the goods 30 from the second module 200 and transports the goods 30 into the second support structure 410 of the fourth modules 400, subsequently the goods 30 are transferred to the first transport mechanism 320 of the third module 300 which is adjacent to the first module 100 by the gripping member 424, afterwards the goods are transported by the first transport mechanism 32 and finally loaded by the UAV 20.

The goods delivery terminal of the second embodiment is mounted on the building 40, thus making the goods delivery terminal installed more stably. The goods delivery terminal is suitable for various buildings 40 with different wall shapes by flexibly assembling the third module 300 and the fourth module 400. Moreover, the UAV 20 fulfils the goods 30 loading/offloading on the top portion of the building 40 without a need to fly near the ground, thus lowering flight difficulty for the UAV 20 and avoiding the impact on persons on the ground when the UAV 20 takes off or lands.

Furthermore, the tenth opening 318 of the third module 300 of the second embodiment may be near a window or a balcony of the building 40, the first transport mechanism 320 slides to approach the tenth opening 318, and extends the clamping arms 324 to move out from the ten openings 318, so as to offer convenience that the user may take/put the goods 30 when staying near the window or on the balcony. It should be noted that, the goods delivery terminal may transport the goods 30 which are sent by the user near the window or on the balcony to the second module 200, in order to measure the weight of the goods 30 and to recognize the identity of the goods 30.

Optionally, the goods delivery terminal of the second embodiment is provided with the fifth module 500, and the fifth module 500 is arranged at the side of the third module 300 which is adjacent to the second module 200.

According to the goods delivery terminal of the second embodiment, the present disclosure also provides a method for assembling the goods delivery terminal, which comprises the following steps:

arranging the first module 100 on the top portion of the building 40;

arranging the second module 200 on the ground and near the building 40;

arranging one third module 300 adjacent to the second module 200, and arranging another third module 300 adjacent to the first module 100;

arranging the fourth module 400 between the two third modules 300.

Figure 15:
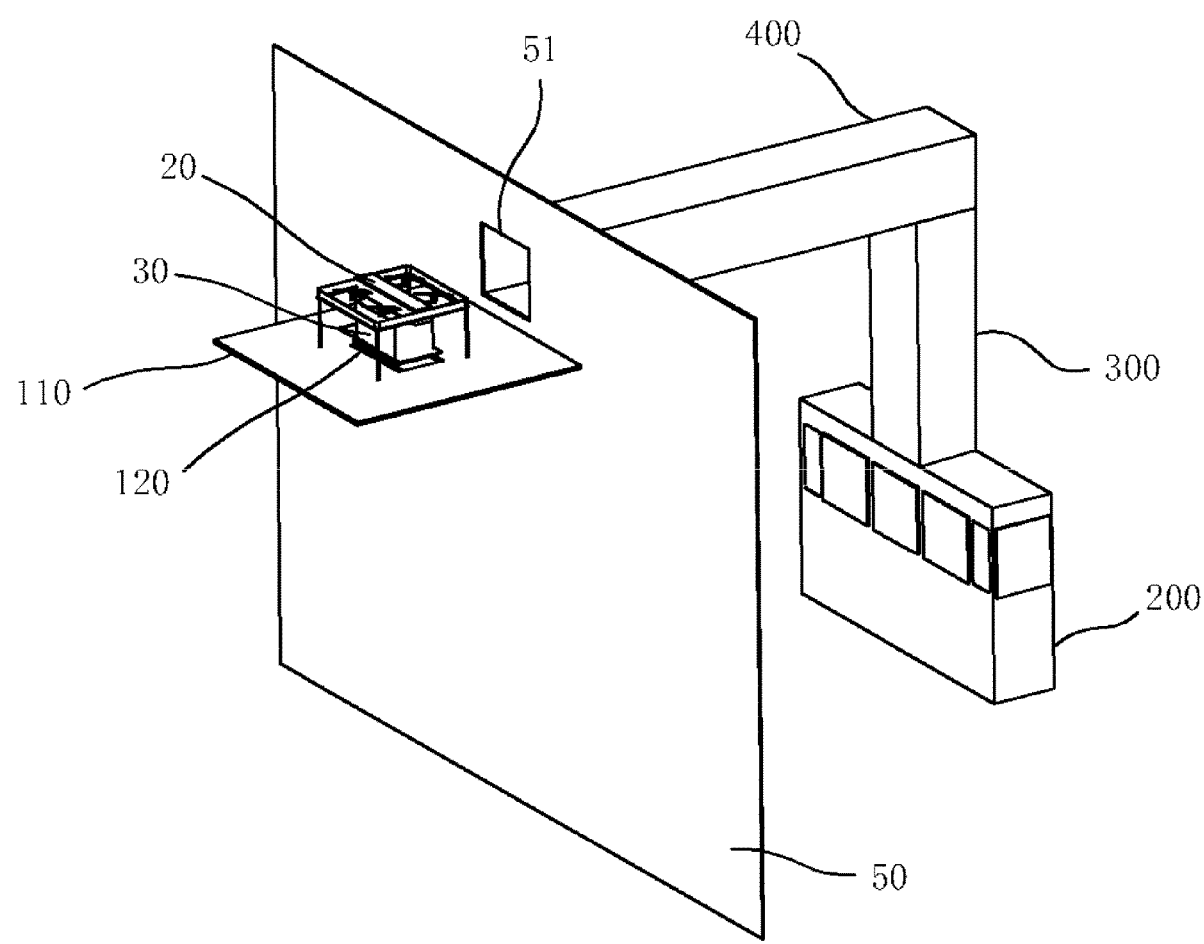
FIG. 15 is a schematic structural diagram of a goods delivery terminal in the third embodiment.

As shown in FIG. 15, the goods delivery terminal of the third embodiment is another assembly form of the above-mentioned goods delivery terminal. The goods delivery terminal of the third embodiment is deployed on a storey of a multi-storey building 50, and comprises the first module 100, the second module 200, the third module 300 and the fourth module 400.

The first module 100 is arranged on the exterior wall of the building 50. In the third embodiment, the first module 100 is provided with the lift table 120.

The second module 200 is arranged inside the building 50 and installed on the floor of the storey which is close to the first module 100 in elevation.

The third module 300 is arranged inside the building 50 and adjacent to the second module 200. The fourth module 400 is arranged between the third module 300 and the first module 100, and is installed on the ceiling of the storey where the second module 200 is disposed.

Specifically, a through hole 51 communicates inside and outside of the building 50 is formed in the wall of the building 50, the first module 100 is arranged near the through hole 51, and the fourth module 400 is adjacent to or partially disposed at the through hole 51, so that the fourth module 400 is capable of partially passing through the through hole 51 and transferring the goods to/from the first module 100. Wherein the sixth opening 412 of the fourth module 400 may be communicated with the through hole 51, and after moving out from the sixth opening 412, the gripping member 424 is capable of being located above the lift table 120; the eighth opening 416 of the fourth module 400 is communicated with the fourth opening 312 of the third module 300.

A method for delivering the goods 30 based on the goods delivery terminal of the third embodiment is as follows.

Delivery of the goods 30 from the UAV 20 to the second module 200 is as follows: the UAV 20 offloads the goods 30 onto the lift table 120 and flies away. The gripping member 424 moves out from the sixth opening 412 and grabs the goods 30 on the lift table 120, subsequently the gripping member 424 transports the goods 30 and releases the goods 30 to the first transport mechanism 320, afterwards the first transport mechanism 320 transports the goods 30 and releases the goods 30 to the second module 200.

Delivery of the goods 30 from the second module 200 to the UAV 20 is as follows: the first transport mechanism 320 grabs the goods 30 from the second module 200 and transports the goods 30 to the gripping member 424, subsequently the gripping member 424 slides and moves out from the sixth opening 412 to release the goods 30 onto the lift table 120, after releasing the goods 30 the gripping member 424 moves back into the second support structure

410 to avoid obstructing landing of the UAV 20, finally the UAV 20 lands on the first module 100 and loads the goods 30.

The goods delivery terminal of the third embodiment may be deployed on the storey where the user stays, enabling the UAV 20 to load/offload the goods 30 on the same storey, thus shortening a distance that the goods delivery terminal transports the goods 30. Besides, due to block of the wall of the building 50, the physical contact of the UAV 20 and the user is avoided, and the flight noise of the UAV 20 is also prevented from spreading into the indoor room.

Furthermore, the first module 100 of the third embodiment may rotate relative to the building 50, that is, the first module 100 is rotatably installed on the exterior wall of the building 50, so as to realize that when the first module is not utilized, the first module 100 rotates until it closely approaches the exterior wall, thereby reducing the size that the first module 100 protrudes from the wall, and also making the first module 100 block the through hole 51. Optionally, a rotating bracket is arranged between the first module 100 and the building 50, a fixed part of the rotating bracket is installed on the exterior wall of the building 50, and the first module 100 is mounted to a rotating part of the rotating bracket, enabling the first module 100 to rotate relative to the building 50.

According to the goods delivery terminal of the third embodiment, the present disclosure also provides another method for assembling the goods delivery terminal, which comprises the following steps:

arranging the first module outside a building;
arranging the second module inside the building;
arranging the third module inside the building and adjacent to the second module;
arranging the fourth module between the third module and the first module.

The technical features of the above-mentioned embodiments can be combined. In order to simplify the description, not all possible combinations of the technical features of the above-mentioned embodiments have been provided. It can be appreciated that, as long as no contradiction is concluded from these combinations, all reasonable combinations of the features should be considered as the scope recorded in the description.

The present disclosure mainly presents several embodiments with their descriptions more specific and detailed than others, but they should not be construed as limiting the scope of the present disclosure. It should be noted that for persons skilled in the art, several modifications and improvements can be made without departing from the conception of the present disclosure, which shall all fall within the scope of the present disclosure. Therefore, the scope of the present disclosure shall be subject to the appended claims.

The invention claimed is:

1. A goods delivery terminal, comprising:
a first module for a UAV to land;
a second module for a user to access goods;
a third module capable of transporting the goods in a first direction, wherein the third module is capable of transferring the goods to the second module, and transferring the goods from the second module, the third module is also capable of transferring the goods to the UAV or the first module at the first module, and transferring the goods from the UAV or the first module at the first module;
a fourth module capable of transporting the goods in a second direction intersecting the first direction, wherein the fourth module is capable of transferring the goods to the UAV or the first module at the first module, and transferring the goods from the UAV or the first module at the first module, the fourth module and the third module are also capable of transferring the goods to or from each other;
wherein at least one of the third module and the fourth module is capable of being solely arranged between the first module and the second module, and is capable of independently transporting the goods from the first module to the second module and from the second module to the first module; the third module and the fourth module are also capable of being arranged together between the first module and the second module, and are capable of relay transporting the goods from the second module to first module and from the first module to second module.

2. The goods delivery terminal of claim 1, wherein the first module comprises a support base and a lift table, a first opening for the goods to pass through is formed in the support base, the lift table is capable of being installed on the support base, the lift table is capable of supporting the goods and lifting the supported goods up and down; and wherein, the third module is capable of being arranged at least partially below the first module, and the fourth module is capable of being arranged at least partially at a side of the first module, the third module is capable of transferring the goods to the UAV via the first opening, and transferring the goods from the UAV via the first opening, the fourth module is capable of transporting the goods from the lift table, and transporting the goods to the lift table.

3. The goods delivery terminal of claim 2, wherein the lift table is detachably installed at the first opening, and when the lift table is installed at the first opening, the lift table shelters at least part of the first opening; or
the lift table is movably installed on the support base, the lift table is capable of moving to the first opening so as to shelter at least part of the first opening, and is also capable of moving to make the first opening fully exposed.

4. The goods delivery terminal of claim 1, wherein the third module comprises a first support structure and a first transport mechanism;
the first support structure is a hollow long structure with an opening at each end, the first transport mechanism is slidable in the first support structure; after receiving the goods at either end of the first support structure, the first transport mechanism is capable of transporting the goods to the other end of the first support structure; and wherein a fourth opening and a fifth opening are the opening at each end of the first support structure respectively;
the first transport mechanism comprises a first moving member and two oppositely arranged clamping arms arranged on the first moving member, the first moving member is slidable inside the first support structure, and the two clamping arms are capable of clamping the goods;
a first opening for the goods to pass through is formed the first module; when the fourth opening is communicated with the first opening, the clamping arms are capable of at least partially moving out from the fourth opening and passing through the first opening to transfer the goods to or from the UAV.

5. The goods delivery terminal of claim 4, wherein a plurality of the first support structures are capable of being end to end joined to form a first transport channel, wherein the fourth opening of one of two adjacent first support structures is communicated with the fifth opening of the other, and one first transport mechanism is capable of moving from one end to the other end of the first transport channel, thereby increasing a distance of transporting the goods in the first direction; and/or wherein, the first transport mechanism is capable of sliding relative to the first support structure via the first moving member, enabling the clamping arms to at least partially move out from the fourth opening.

6. The goods delivery terminal of claim 4, wherein the fourth module comprises a second support structure and a second transport mechanism;

the second support structure is a hollow long structure with an opening at each end, the second transport mechanism is slidable in the second support structure; after receiving the goods at either end of the second support structure, the second transport mechanism is capable of transporting the goods to the other end of the second support structure; and wherein a sixth opening and a seventh opening are the opening at each end of the second support structure respectively;

the second transport mechanism comprises a second moving member and a gripping member arranged on the second moving member, the second moving member is slidable inside the second support structure, and the gripping member is capable of grabbing the goods;

the first module is provided with a lift table, the lift table is capable of supporting the goods and lifting the supported goods up and down; when the second support structure is located at a side of the first module and the sixth opening is near edge of the first module, the gripping member is capable of moving out from the sixth opening, to grab the goods from the lift table and to release the goods onto the lift table.

7. The goods delivery terminal of claim 6, wherein a plurality of the second support structures is capable of being end to end joined to form a second transport channel, wherein the sixth opening of one of two adjacent second support structures is communicated with the seventh opening of the other, and one second transport mechanism is capable of moving from one end to the other end of the second transport channel, thereby increasing a distance of transporting the goods in the second direction; and/or wherein, the second transport mechanism is capable of sliding relative to the second support structure via the second moving member, enabling the gripping member to move out from the sixth opening; and/or wherein, the gripping member is slidable relative to the second moving member, and the sliding direction is parallel to the direction in which the second moving member slides relative to the second support structure, so as to increase a sliding distance of the gripping member compared with the second moving member.

8. The goods delivery terminal of claim 6, wherein an eighth opening is formed in a side wall of the second support structure, the eighth opening is near the seventh opening; when the fourth module is at least partially above the third module and the fourth opening is communicated with the eighth opening, the clamping arms are capable of at least partially moving out from the fourth opening and moving into the second support structure to transfer the goods to or from the second transport mechanism; and/or wherein, a ninth opening is formed in a side wall of the first support structure, the ninth opening is near the fifth opening; when the third module is at least partially higher than the fourth module and the ninth opening is communicated with the sixth opening, the gripping member is capable of moving out from the sixth opening and moving into the first support structure to transfer the goods to or from the first transport mechanism.

9. The goods delivery terminal of claim 4, the two clamping arms are capable of extending or retracting in a third direction intersecting the first direction to move the goods in the third direction; a tenth opening is further provided in a side wall of the first support structure, the two clamping arms are configured to extend and partially move out from the tenth opening to move the goods out of the first support structure or to clamp the goods from the outside of the first support structure.

10. The goods delivery terminal of claim 9, wherein the goods delivery terminal further comprises a fifth module used to store the goods, the fifth module is provided with a storage space and an eleventh opening for the goods to enter and to exit the storage space; when the fifth module is located at a side of the third module and the tenth opening is communicated with the eleventh opening, the clamping arms are capable of moving the goods into the storage space or clamping the goods from the storage space;

and wherein each clamping arm further comprises a positioning piece, the positioning pieces are each mounted to the opposite sides of extending parts of the clamping arms, and are each disposed at end portion of the respective extending part, the positioning pieces are capable of pushing the goods located in the fifth module by extension or retraction of the clamping arms in the third direction in order to adjust a position of the goods.

11. The goods delivery terminal of claim 1, wherein the third module is also capable of moving the goods in a third direction intersecting the first direction; the goods delivery terminal further comprises a fifth module used for storing the goods, the fifth module is provided with a storage space, and the third module is capable of moving the goods into or out of the storage space by moving the goods in the third direction;

and wherein a plurality of fifth modules are capable of being positioned at a side of the third module and stacked along the first direction.

12. The goods delivery terminal of claim 1, wherein the second module is provided with a main controller, the third module and the fourth module are both capable of being electrically connected to the first module and to the second module, and are both capable of transmitting electricity and data, the third module and the fourth module are also capable of being electrically connected to each other, thus enabling the main controller to control operation of the first module, the third module, the fourth module and the second module; and/or wherein the first direction is vertical direction, the second direction is horizontal direction.

13. The goods delivery terminal of claim 1, wherein the second module is a cabinet structure; the second module comprises at least one second opening for the user to access the goods; the second module further comprises a third opening for goods transfer to/from the third module or the fourth module; the third opening is arranged in a top or side surface of the second module; and/or wherein the fourth module is capable of being arranged between two fourth modules to transfer the goods between those two third modules.

14. The goods delivery terminal of claim 1, wherein the first module is configured to be arranged on the top portion of a building; the second module is configured to be arranged on the ground and near an exterior wall of building; one group of third modules are configured to be arranged adjacent to the second module, and another groups of third modules are configured to be arranged adjacent to the first module; the fourth module is configured to be arranged between the two groups of third modules.

15. The goods delivery terminal of claim 14, wherein the two groups of third modules are configured to be respectively installed on two exterior walls of the building; the two exterior walls are parallel and spaced apart, and are connected by a horizontal terrace; the fourth module is configured to be installed on the horizontal terrace; and/or
wherein, the third module is provided with a tenth opening for the goods to enter and to exit, the tenth opening is configured to be arranged near a window or a balcony of the building.

16. The goods delivery terminal of claim 15, wherein the third module comprises a first support structure and a first transport mechanism; the first transport mechanism comprises a first moving member and two oppositely arranged clamping arms arranged on the first moving member, the first moving member is slidable inside the first support structure, and the two clamping arms are capable of clamping the goods; and
wherein, the first transport mechanism is capable of sliding to approach the tenth opening, and extending the clamping arms to move out from the ten opening, so as to offer convenience that the user may take/put the goods when staying near the window or on the balcony.

17. The goods delivery terminal of claim 1, wherein the first module is configured to be arranged on the exterior wall of a building; the second module is configured to be arranged inside the building; the third module is configured to be arranged inside the building and adjacent to the second module; the fourth module is configured to be arranged between the third module and the first module.

18. The goods delivery terminal of claim 17, wherein the first module is configured to be arranged near a through hole in the wall of the building; the fourth module is configured to be arranged adjacent to or partially disposed at the through hole, so that the fourth module is capable of partially pass through the through hole and transferring the goods to or from the first module; and
wherein, the first module is configured to rotatably installed on the exterior wall of the building, so that when the first module is not utilized, the first module can rotate relative to the building until the first module closely approaches the exterior wall, thereby reducing size that the first module protrudes from the wall, and also making the first module block the through hole.

19. The goods delivery terminal of claim 17, wherein the first module is configured to rotatably installed on the exterior wall of the building, so that when the first module is not utilized, the first module can rotate relative to the building until the first module closely approaches the exterior wall; and/or
wherein, the second module is configured to be arranged on the floor of a storey which is close to the first module in elevation; the fourth module is configured to be arranged on the ceiling of the storey where the second module is disposed; the goods delivery terminal is configured to be deployed on the storey where the user stays, enabling the UAV to load/offload the goods on the same storey.

20. A method for delivering goods by the goods delivery terminal of claim 17, the third module comprises a first support structure and a first transport mechanism; the fourth module comprises a second support structure and a second transport mechanism, the second transport mechanism comprises a second moving member and a gripping member arranged on the second moving member, a sixth opening and a seventh opening are the opening at each end of the second support structure respectively; the first module is provided with a lift table; wherein the method comprises:
after the UAV offloads the goods onto the lift table and flies away, the gripping member moving out from the sixth opening and grabbing the goods on the lift table, subsequently the gripping member transporting the goods and releasing the goods to the first transport mechanism, afterwards the first transport mechanism transporting the goods and releasing the goods to the second module; and/or
the first transport mechanism grabbing the goods from the second module and transporting the goods to the gripping member, subsequently the gripping member sliding and moving out from the sixth opening to release the goods onto the lift table, after releasing the goods the gripping member moving back into the second support structure to avoid obstructing landing of the UAV, enabling the UAV to land on the first module and to load the goods.

\* \* \* \* \*